United States Patent
Okada et al.

(10) Patent No.: US 11,847,230 B2
(45) Date of Patent: Dec. 19, 2023

(54) LEARNING DEVICE ESTIMATING APPARATUS, LEARNING DEVICE ESTIMATING METHOD, RISK EVALUATION APPARATUS, RISK EVALUATION METHOD, AND PROGRAM

(71) Applicant: NIPPON TELEGRAPH AND TELEPHONE CORPORATION, Tokyo (JP)

(72) Inventors: Rina Okada, Musashino (JP); Satoshi Hasegawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 452 days.

(21) Appl. No.: 17/281,985

(22) PCT Filed: Sep. 18, 2019

(86) PCT No.: PCT/JP2019/036595
§ 371 (c)(1),
(2) Date: Apr. 1, 2021

(87) PCT Pub. No.: WO2020/075462
PCT Pub. Date: Apr. 16, 2020

(65) Prior Publication Data
US 2021/0342451 A1 Nov. 4, 2021

(30) Foreign Application Priority Data
Oct. 10, 2018 (JP) .................................. 2018-191461

(51) Int. Cl.
*G06F 21/00* (2013.01)
*G06F 21/57* (2013.01)
(Continued)

(52) U.S. Cl.
CPC ........ *G06F 21/577* (2013.01); *G06F 18/2155* (2023.01); *G06F 18/24* (2023.01);
(Continued)

(58) Field of Classification Search
None
See application file for complete search history.

(56) References Cited

U.S. PATENT DOCUMENTS

2020/0401938 A1* 12/2020 Etkin ..................... G16H 50/30
2021/0019674 A1* 1/2021 Crabtree ............... G06V 30/274

OTHER PUBLICATIONS

Shokri, Reza et al. Membership Inference Attacks Against Machine Learning Models. Proceedings of 2017 IEEE Symposium on Security and Privacy. IEEE[online], May 26, 2017 [retrieved on Nov. 18, 2019], Retrieved from the Internet: <URL: https://ieeexplore.ieee.org/document/7958568>, pp. 3-18 (Year: 2017).*

(Continued)

*Primary Examiner* — Andrew J Steinle
(74) *Attorney, Agent, or Firm* — XSENSUS LLP

(57) ABSTRACT

A learning device estimating apparatus aims at a learning device as an attack target, and comprises a recording part, an inquiring part, a capturing part and a learning part. A predetermined plurality of pieces of observation data are recorded. The inquiring part inquires of the attack target learning device for each of the pieces of observation data recorded in the recording part to acquire label data and records the acquired label data to the recording part in association with observation data. The capturing part inputs the observation data and the label data associated with the observation data that have been recorded to the recording part, to the learning part. The learning part is characterized by using an activation function that outputs a predetermined ambiguous value in a process for determining a classification prediction result, and the learning part performs learning using the inputted observation data and label data.

12 Claims, 12 Drawing Sheets

(51) Int. Cl.
*G06N 20/00* (2019.01)
*G06F 18/24* (2023.01)
*G06F 18/214* (2023.01)
*G06V 30/19* (2022.01)
*G06V 10/778* (2022.01)

(52) U.S. Cl.
CPC ........... *G06N 20/00* (2019.01); *G06V 10/778* (2022.01); *G06V 30/19007* (2022.01); *G06F 2221/033* (2013.01)

(56) References Cited

OTHER PUBLICATIONS

Tramer et al., "Stealing Machine Learning Models via Prediction APIs", In 25th USENIX Security Symposium, USENIX Association, Oct. 3, 2016, pp. 601-618.
Papernot et al., "Practical Black-Box Attacks Against Machine Learning", In Proceedings of the 2017 ACM on Asia Conference on Computer and Communications Security, Mar. 19, 2017, pp. 506-519.
Hinton et al., "Distilling the Knowledge in a Neural Network", In NIPS Deep Learning and Representation Learning Workshop, Mar. 9, 2015, 9 pages.

* cited by examiner label= 5 0 4 1

| Parameter update method | Probabilistic steepest descent method (Mini-batch Learning) |
|---|---|
| Learning rate | $10^{-3}$ |
| Epoch rate | 500 |
| Number of iterations in epoch | $\lfloor |D_2|/50 \rfloor$ |
| Batch size | 50 |
| Dropout rate | 0.5(All bonding layers only) |
| Padding | Zero padding |

| Learning device A | Learning device B |
|---|---|
| input(785)<br>fc1(600, ReLU)<br>fc2(600, ReLU)<br>output(10, Softmax$_T$) | input(785)<br>conv1(5 × 5 × 32, ReLU)<br>pool1(Maxpool)<br>conv2(5 × 5 × 64, ReLU)<br>pool2(Maxpool)<br>fc(1024, ReLU)<br>output(10, Softmax$_T$) |

FIG. 14

| Number of pieces of data<br>Learning device | 687 | 1375 | 2750 | 5500 | 11000 |
|---|---|---|---|---|---|
| Learning device A | 90.817 | 93.284 | 94.982 | 96.028 | 96.704 |
| Learning device B | 93.391 | 95.486 | 96.692 | 97.697 | 98.311 |

FIG. 15

LEARNING DEVICE ESTIMATING APPARATUS, LEARNING DEVICE ESTIMATING METHOD, RISK EVALUATION APPARATUS, RISK EVALUATION METHOD, AND PROGRAM

CROSS-REFERENCE TO RELATED APPLICATIONS

The present application is based on PCT filing PCT/JP2019/036595, filed Sep. 18, 2019, which claims priority to JP 2018-191461, filed Oct. 10, 2018, the entire contents of each are incorporated herein by reference.

TECHNICAL FIELD

The present invention relates to a learning device estimating apparatus and a learning device estimating method for estimating a learning device for classification, and a risk evaluation apparatus and a risk evaluation method for the learning device, and programs for executing the methods.

BACKGROUND ART

The number of companies developing such a service that various persons can use a learning device for classification via an API (application programming interface) has been increasing. However, it is pointed out that there is a possibility that a malicious user can estimate the learning device by using the API (Non-patent literatures 1 and 2). In the field of computer security, the estimation (extraction, reproduction, reconstruction) of the learning device is known as a model extraction attack or a model reconstruction attack. Note that Non-patent literature 3 is literature about a softmax function with temperature that will be described in the specification of the present application.

Non-patent literature 1 is literature about a model extraction attack against a binary classification learning device. It is shown that it is possible to perform a model extraction attack against a learning device called logistic regression, which is often used for binary classification data, and obtain an attack result with a very high correct answer rate. This is because, when an inverse function of a sigmoid function is used, the logistic regression learning device can be expressed by a multidimensional linear expression and can be solved by acquiring prediction results corresponding to the number of dimensions of the multidimensional linear expression.

Non-patent literature 2 is literature about a model extraction attack against a multi-value classification learning device. A method for creating a learning device for creating data capable of deceiving target learning (called an adversarial example) is proposed. A correct answer rate of a fake learning device for MNIST, which is a handwritten character dataset, is described. Specifically, 9,600 prediction results are acquired using an attack target deep neural net, and a fake learning device is created.

PRIOR ART LITERATURE

Non-Patent Literature

Non-patent literature 1: Florian Tramer, Fan Zhang, Ari Juels, Michael K. Reiter, and Thomas Ristenpart, "Stealing machine learning models via prediction apis," In 25th USENIX Security Symposium (USENIX Security 16), pages 601-618, Austin, TX, 2016. USENIX Association.

Non-patent literature 2: Nicolas Papernot, Patrick McDaniel, Ian Goodfellow, Somesh Jha, Z. Berkay Celik, and Ananthram Swami, "Practical black-box attacks against machine learning," In Proceedings of the 2017 ACM on Asia Conference on Computer and Communications Security, ASIA CCS '17, pages 506-519, New York, NY, USA, 2017. ACM.

Non-patent literature 3: Geoffrey Hinton, Oriol Vinyals, and Jeffrey Dean, "Distilling the knowledge in a neural network," In NIPS Deep Learning and Representation Learning Workshop, 2015.

SUMMARY OF THE INVENTION

Problems to be Solved by the Invention

In the case of Non-patent literature 1, however, when a similar model extraction attack is considered for a learning device including a softmax function that is often used for multi-value classification in which there are more classifications than binary classification, it is not possible to express the learning device by a linear expression. Further, motivation of the author et al. of Non-patent literature 2 is to create an adversarial example, and much importance is not attached to a correct answer rate of a fake learning device. Therefore, the correct answer rate of the created fake learning device is deviated from the correct answer rate of the attack target learning device by 10% or more.

In other words, though a possibility that a user who does not know details of a learning device that performs classification, which is to be an attack target, can estimate the learning device only by seeing an output of the learning device (a possibility that a fake is created) is mentioned, there is not an effective method for estimating a learning device. If there is not an effective learning device estimating method, it is not possible to evaluate the risk that a fake of a target learning device is created.

Therefore, an object of the present invention is to establish a learning device estimating apparatus and a learning device estimating method capable of effectively estimating a learning device for classification, and a risk evaluation method for the learning device.

Means to Solve the Problems

A learning device estimating apparatus of the present invention aims at a learning device, for classification task that outputs a type of inputted observation data as label data, as an attack target, and the learning device estimating apparatus comprises a recording part, an inquiring part, a capturing part and a learning part. In the recording part, a predetermined plurality of pieces of observation data are recorded. The inquiring part inquires of the attack target learning device for each of the pieces of observation data recorded in the recording part to acquire label data and records the acquired label data to the recording part in association with observation data. The capturing part inputs the observation data and the label data associated with the observation data that have been recorded to the recording part, to the learning part. The learning part is characterized by using an activation function that outputs a predetermined ambiguous value in a process for determining a classification prediction result, and the learning part performs learning using the inputted observation data and label data.

A risk evaluation method of the present invention evaluates a risk of an attack to a learning device for classification task that outputs a type of inputted observation data as label data, using a learning device estimating apparatus provided with a learning part. The risk evaluation method of the present invention executes an attack target classification predicting step, an estimation learning step, a correct answer rate acquiring step and a risk judging step. At the attack target classification predicting step, a plurality of pieces of observation data are inputted to the learning device that has finished learning; pieces of predicted label data that are classification predictions at the time of inputting the each of pieces of observation data are acquired; and a data set for estimation that is a set of pairs of observation data and predicted label data is obtained. At the estimation learning step, the learning part learns using the data set for estimation to obtain the learning part that has finished learning. Note that the learning part uses an activation function that outputs a predetermined ambiguous value in a process for determining a classification prediction result. At the correct answer rate acquiring step, a target correct answer rate, which is a correct answer rate of the learning device that has finished learning, and an estimated correct answer rate, which is a correct answer rate of the learning part that has finished learning, are determined using a predetermined plurality of pairs of observation data and label data for test. At the risk judging step, it is judged that a risk is higher as a difference between the target correct answer rate and the estimated correct answer rate is smaller when the target correct answer rate is larger than the estimated correct answer rate, and as the estimated correct answer rate exceeds the target correct answer rate more when the target correct answer rate is smaller than the estimated correct answer rate.

Effects of the Invention

According to a learning device estimating apparatus and a learning device estimating method of the present invention, since an activation function that outputs an ambiguous value like a softmax function with temperature is used, a generalization error can be reduced. Therefore, it is possible to effectively estimate an attack target learning device by learning with a small amount of data. Since a risk evaluation apparatus and a risk evaluation method of the present invention also use an activation function that outputs an ambiguous value like a softmax function with temperature, it is possible to judge whether an attack target learning device can be estimated by learning with a small amount of data. Therefore, the risk evaluation method can be established.

BRIEF DESCRIPTION OF THE DRAWINGS

FIG. 14 is a diagram showing specifications of learning devices; and

FIG. 15 is a diagram showing a relationship between the number of pieces of data used for learning and a correct answer rate.

DETAILED DESCRIPTION OF THE EMBODIMENT

Figure 1:
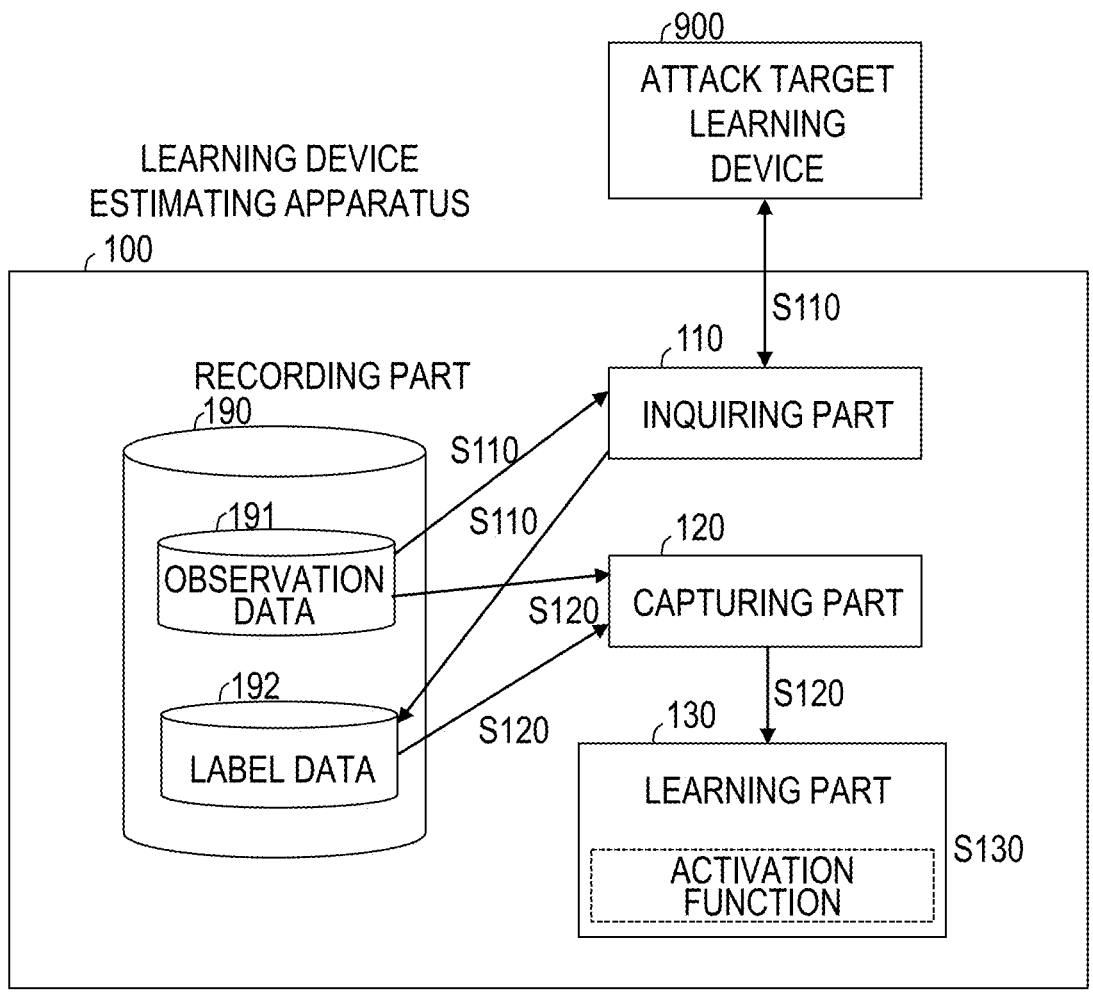
FIG. 1 is a diagram showing a functional configuration example of a learning device estimating apparatus.

An embodiment of the present invention will be described below in detail. Note that the same number will be attached to components having the same function, and duplicate description will be omitted. Though each of signs "~", "^" and the like used in sentences originally should be written right above a character immediately after the sign, the sign is written immediately before the character because of restriction of notation of text. In formulas, these signs are written at the original positions, that is, right above characters.

First Embodiment

<Assumption: Correct Answer Rate>

An attacker performs estimation of a learning device for classification (a learning device for classification task) f, which is an attack target, to create an estimated learning device $g_f$ of f. The attacker aims at creating $g_f$ having a high correct answer rate, utilizing f. The correct answer rate is assumed to be indicated by Formula (1).

$$Acc(X, \tilde{Y}, \hat{Y}) = \frac{|\{\tilde{y}_i : \tilde{y}_i = \hat{y}_i : \tilde{y}_i \in \tilde{Y}, \hat{y}_i \in \hat{Y}, \forall i \in N[1, |X|]\}|}{|X|} \quad (1)$$

Here, it is assumed that X is a set of data to be inputted to $g_f$ (hereinafter called observation data); is a set of results of types that have been classification-predicted by f for each piece of observation data in X (hereinafter called classification-predicted label data); ^Y is a set of true types for the pieces of observation data in X (hereinafter called true label data); N[a,b] is a set of integers between a and b, including a and b, ~$y_i$ is label data of the i-th observation data, for which has f has been classification-predicted; and ^$y_i$ is true label data for the i-th observation data. The observation data is data desired to be classified and is various data, for example, image data, purchase data, voice data and position data, genomic data, and the like. At the time of assembling $g_f$, it is necessary for the attacker to estimate a structure of $g_f$ and a parameter called a weight in $g_f$. The present invention relates to estimation of the weight parameter between the structure and the weight parameter.

<Assumption: Attack Target Learning Device>

Such a vector $x \in R^N$ that has an arbitrary integer number of (N) positive elements and that each of the elements is an arbitrary real number R is assumed to be observation data desired to be classified, and an attack target learning device for classification is assumed to be f. In other words, it is assumed that an input to f is x, and an output f(x) for the input is a scalar or a vector. It is assumed that the scalar corresponds to classified types, and components of the vector correspond to certainty degrees of the classified types. (Note that a total of the components of the vector does not have to be 100%. If the total is not 100%, 100% can be obtained in total, for example, by "dividing each of the components by a total value of the components and multiplying the quotient by 100".)

For example, in the case of a scalar, it is assumed that a scalar {0,1,2} corresponds to classified types {strawberry, orange, grape}. At this time, if f(x)=1 is satisfied, it means that f has classified the observation data x as "orange".

For example, in the case of a vector, it is assumed that components of the vector correspond to the classified types {strawberry, orange, grape}, respectively. At this time, if f(x)=(10,20,70) is satisfied, it means that f classifies the observation data x as "strawberry" with a certainty degree of 10%, classifies the observation data x as "orange" with a certainty degree of 20%, and classifies the observation data x as "grape" with a certainty degree of 70%. In other words, a classification showing that the possibility of the observation data x being "grape" is high is made. Note that, in the case of a vector, it does not matter whether the total of components is 100 or 1 in terms of a rate, and, therefore, the total of the components will be hereinafter assumed to be 1.

<Learning Device Estimating Apparatus, Learning Device Estimating Method>

Figure 2:
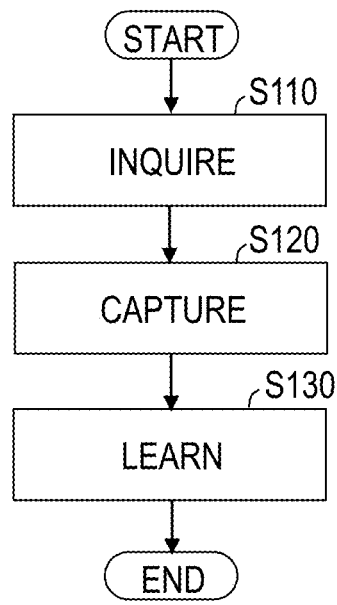
FIG. 2 is a diagram showing a process flow of the learning device estimating apparatus.

FIG. 1 shows a functional configuration example of a learning device estimating apparatus, and FIG. 2 shows a process flow of the learning device estimating apparatus. A learning device estimating apparatus 100 aims at a learning device 900, for classification task that outputs a type of inputted observation data as label data, as an attack target, and the learning device estimating apparatus 100 is provided with a recording part 190, an inquiring part 110, a capturing part 120 and a learning part 130. In the recording part 190, a predetermined plurality of pieces of observation data are recorded.

The inquiring part 110 inquires of the attack target learning device 900 for each of the pieces of observation data recorded in the recording part 190 to acquire label data and records the acquired label data to the recording part 190 in association with the observation data (an inquiring step S110).

The capturing part 120 inputs the observation data and the label data associated with the observation data that have been recorded to the recording part 190, to the learning part 130 (causes the learning part 130 to capture them) (a capturing step S120).

The learning part 130 performs learning using the inputted observation data and label data (a learning step S130). The learning part 130 is characterized by using an activation function that outputs a predetermined ambiguous value in a process for determining a classification prediction result (a final-stage process). More specifically, when it is assumed that the number of classified types is indicated by D (here, D is an integer equal to or larger than 2), T indicates a predetermined value that is equal to or larger than 1, c indicates an integer between 1 and D, including 1 and D, $u_c$ indicates the c-th element of a vector inputted to the activation function, and $\tilde{y}_c$ indicates the c-th element of a vector outputted as a classification result, for example, the activation function can be as follows.

$$\tilde{y}_c = \text{Softmax}_T(u_c) = \frac{\exp(u_c/T)}{\sum_{d=1}^{D} \exp(u_d/T)} \quad (2)$$

This activation function is a softmax function with temperature (see Non-patent literature 3), the temperature being indicated by T. The softmax function with temperature will output a more ambiguous value as the temperature T is increased more. Thus, the learning part 130 need only have an activation function that outputs an ambiguous value like a softmax function with temperature, as a final output function.

At the learning step S130, the learning part performs learning with the observation data x and the label data f(x), which is an output of the attack target learning device 900, as inputs. Note that, when f(x) is a scalar, and the number of classified types is M (an integer equal to or larger than 2), the scalar f(x) is converted to a vector $v_{f(x)}$ with a length of M, and causes the vector $v_{f(x)}$ to be an input to $g_f$. As for a method for the conversion, a vector with a length of M (the number of elements is M) is prepared, and only the f(x)-th element of the vector is caused to be 1, while all the other elements being caused to be 0. When f(x) is a vector, the vector is caused to be an input to $g_f$ as it is.

The learning part 130 estimates the learning device 900 for classification task that classifies inputs into two or more types. As for the attack target learning device 900, any structure is possible if an output is a classification result. If the final output function is such that a classification prediction result is outputted like the softmax function with temperature shown by Formula (2), the learning part 130 operates in any other structure. As "any other structure" except for the final output function, there are, for example, a general neural net (fully coupled), a convolutional neural net and the like. However, since the correct answer rate of classification differs according to structures, all the structures may be not optimal. The learning part 130 may be a learning device of a single softmax function with temperature. A method for updating the weight parameter of the learning part 130 is also arbitrary. As a learning method, there are, for example, a stochastic gradient descent method, a steepest descent method, an AdaGrad method, a momentum method and the like, which are known techniques.

After the learning step S130 ends, when observation data x in the same format as the attack target learning device 900 is inputted, the learning part 130 outputs label data $g_f(x)$ in the same format as the attack target learning device 900. Here, $g_f(x)$ is a scalar or a vector similarly to the above description.

Figure 3:
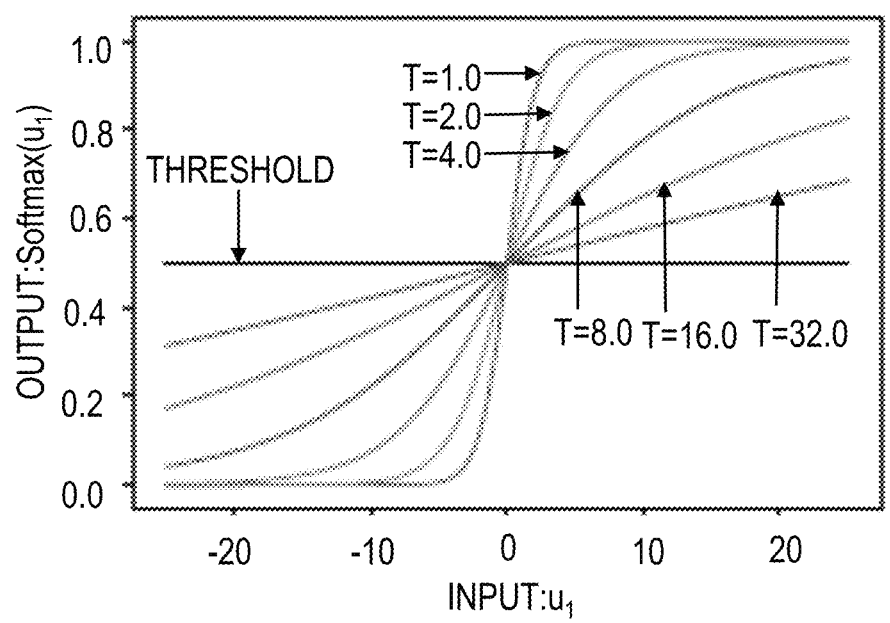
FIG. 3 is a diagram showing characteristics of a softmax function with temperature when an input to the softmax function with temperature is $u=(u_1, u_2)^T=(u_1, 0.0)$.

FIG. 3 shows characteristics of a softmax function with temperature when an input to the softmax function with temperature is $u=(u_1, u_2)^T=(u_1, 0.0)$. From FIG. 3, it is seen that the softmax function becomes a function that outputs a more ambiguous value as the temperature T increases. For example, by using this softmax function with temperature, it is possible to reduce a generalization error. An attacker should perform learning with a small amount of data because the attacker wants to suppress use of an API as far as possible. As training data is less, the generalization error increases more. Machine learning aims at reducing the generalization error; and, as for a DNN (deep learning device: deep neural network) that an attacker wants to create, the lower the generalization error, the better the DNN is. From this, it is shown in the present invention that an activation function that outputs an ambiguous value like a softmax function with temperature is used in order to reduce the generalization error. Therefore, the learning device estimating apparatus and the learning device estimating method of the present invention make it possible to reduce the generalization error and, therefore, make it possible to estimate an attack target learning device by learning with a small amount of data. In other words, the learning device estimating apparatus and the learning device estimating method of the present invention make it possible to effectively estimate a learning device for classification.

<Risk Evaluation Method 1>

Figure 4:
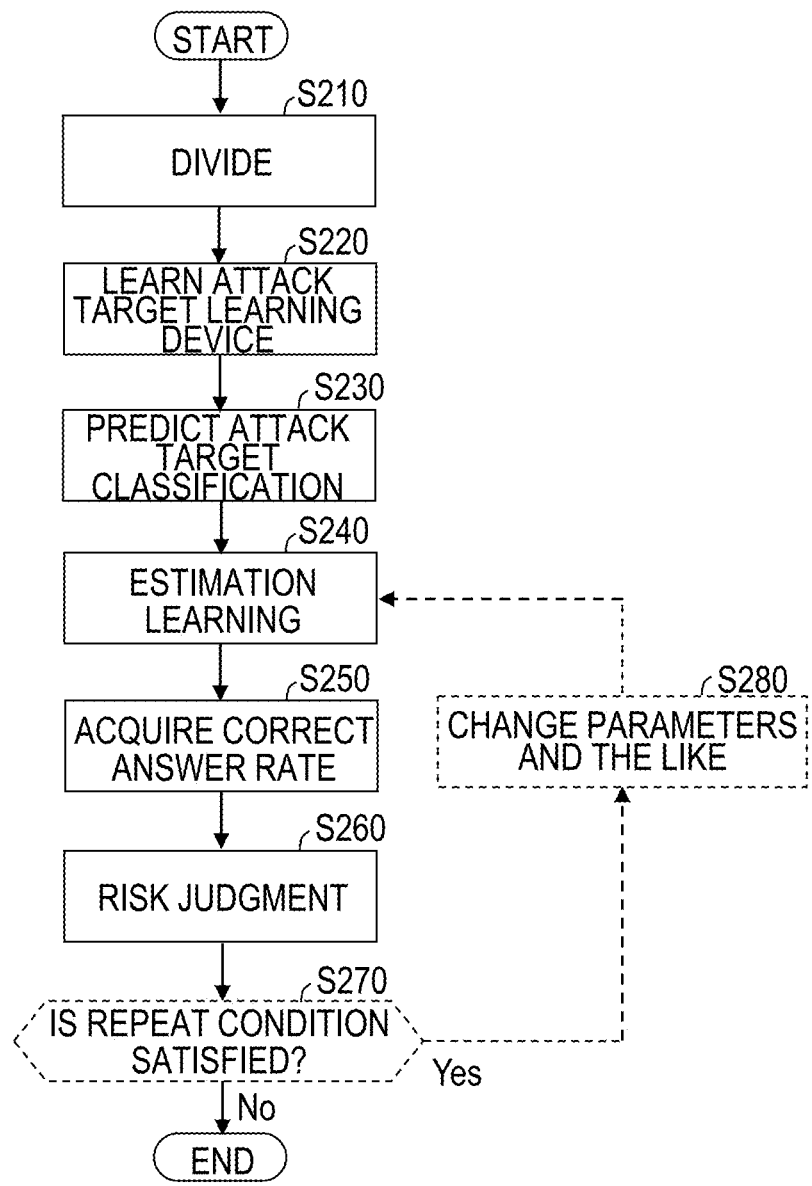
FIG. 4 is a diagram showing a process flow of a risk evaluation method 1.
Figure 5:
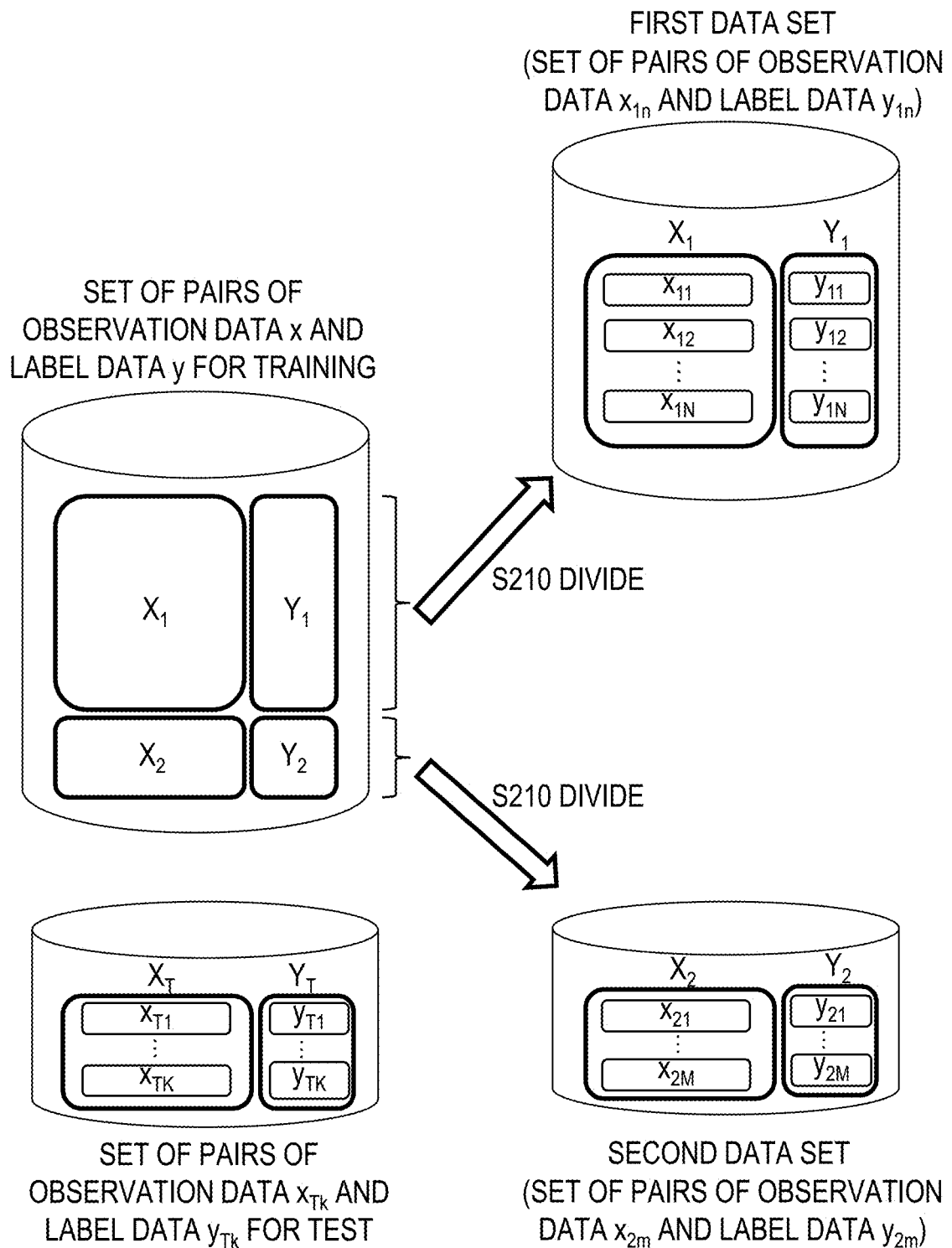
FIG. 5 is a diagram showing an image of a dividing step.
Figure 6:
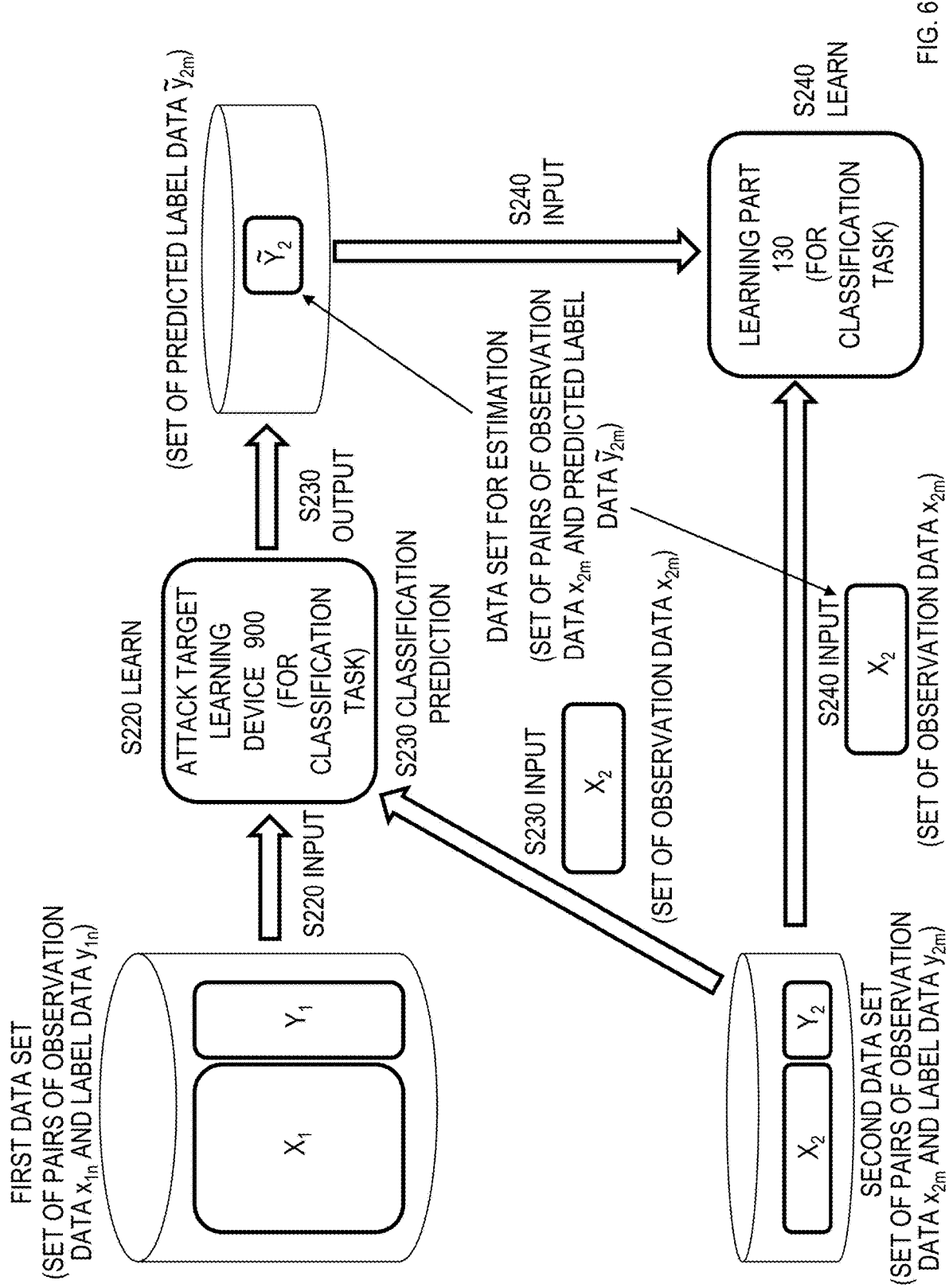
FIG. 6 is a diagram showing an image of an attack target learning device learning step, an attack target classification predicting step and an estimation learning step of the risk evaluation method 1.
Figure 7:
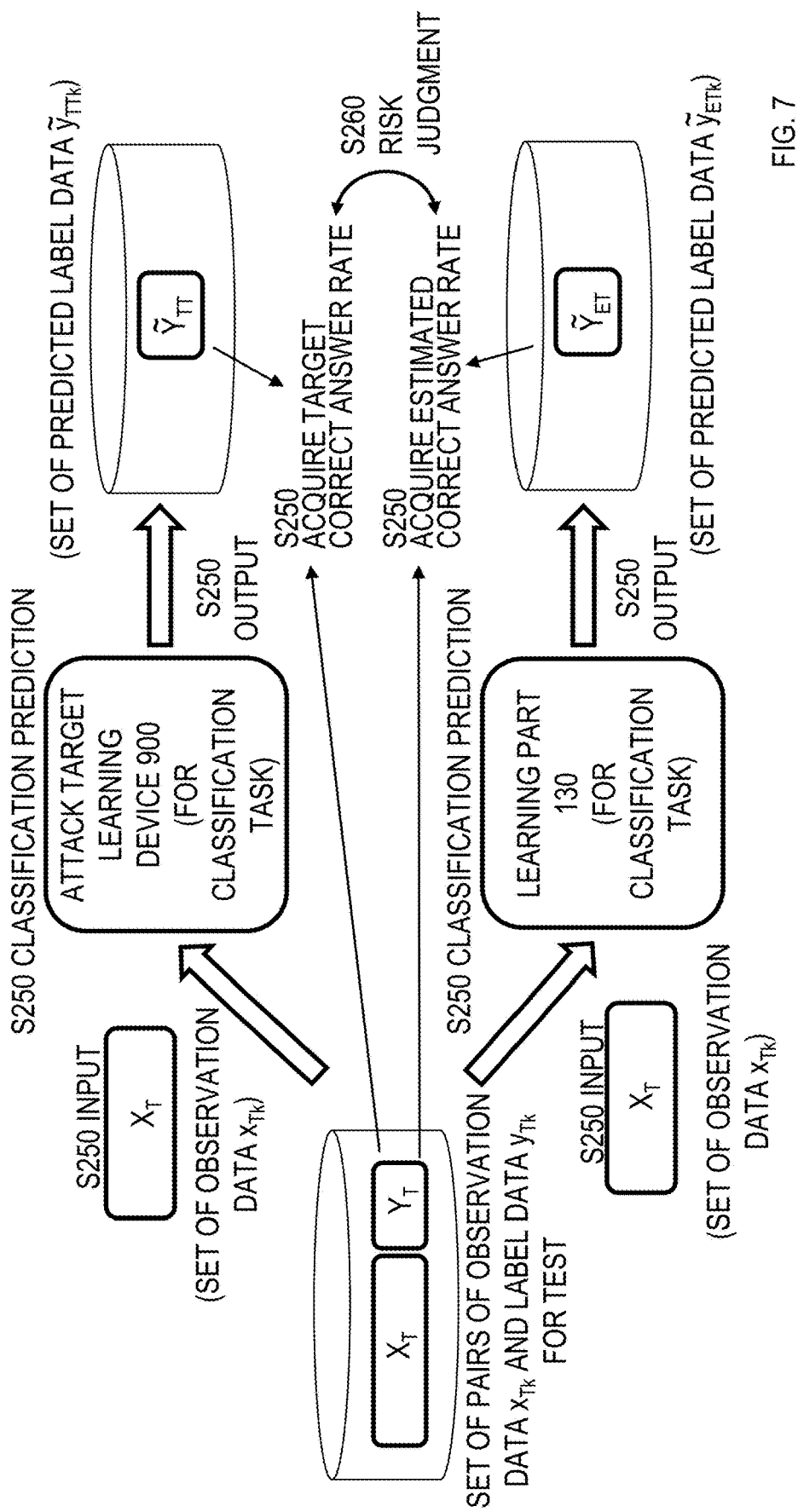
FIG. 7 is a diagram showing an image of a correct answer rate acquiring step and a risk judging step.

FIG. 4 shows a process flow of a risk evaluation method 1. FIG. 5 is a diagram showing an image of a dividing step; FIG. 6 is a diagram showing an image of an attack target learning device learning step, an attack target classification predicting step and an estimation learning step; and FIG. 7 is a diagram showing an image of a correct answer rate acquiring step and a risk judging step.

The risk evaluation method of the present invention evaluates a risk of an attack to the learning device 900 for classification task that outputs a type of inputted observation data as label data, using a learning device estimating apparatus 100 provided with the learning part 130. In the risk evaluation method, a set of pairs of observation data and label data for training and a set of pairs of observation data and label data for test are used. Note that the set of pairs of observation data and label data for test is only required not to include data common to the set of pairs of observation data and label data for training.

As shown in FIG. 5, a predetermined set of a plurality of pairs of observation data and label data for training is divided into a first data set and a second data set first (a dividing step S210). At the dividing step S210, at the time of dividing the set of pairs of observation data and label data for training, the division is performed such that the number of pairs N of the first data set is larger than the number of pairs M of the second data set. For example, the number of pairs of the first data set is four times the number of pairs of the second data set.

The attack target learning device 900 is caused to learn using the first data set to obtain a learning device that has finished learning (an attack target learning device learning step S220). By inputting observation data $x_{2m}$ (m=1, ..., M) in a set of observation data $X_2$ in the second data set to the learning device 900 that has finished learning and acquiring predicted label data $\tilde{y}_{2m}$ (m=1, ..., M), which is classification prediction (an output) at the time of inputting the observation data, a set of predicted label data $\tilde{Y}_2$ is acquired; and a data set for estimation, which is a pair of the set of the observation data $X_2$ and the set of predicted label data $\tilde{Y}_2$, is obtained (an attack target classification predicting step S230). Then, the learning part 130 learns using the data set for estimation to obtain a learning part that has finished learning (an estimation learning step S240). Images of these are shown in FIG. 6. Note that the learning part 130 uses a predetermined activation function that outputs an ambiguous value in the process for determining a classification prediction result. A specific example of the activation function that outputs an ambiguous value is the same as the description of the learning device estimating apparatus and the learning device estimating method described above.

The attack target classification predicting step S230 corresponds to the inquiring step S110 of the learning device estimating method. If the set of observation data $X_2$ is recorded in the recording part 190 in advance, an inquiry is made for each piece of observation data $x_{2m}$ (m=1, ..., M) to acquire (predicted) label data $\tilde{y}_{2m}$ (m=1, ..., M), and the acquired (predicted) label data $\tilde{y}_{2m}$ is recorded to the recording part 190 in association with the observation data $x_{2m}$, then the attack target classification predicting step S230 and the inquiring step S110 are the same. A set of pairs of observation data $x_{2m}$ and (predicted) label data $\tilde{y}_{2m}$ correspond to the data set for estimation. The estimation learning step S240 corresponds to the capturing step S120 and the learning step S130. In other words, if the observation data $x_{2m}$ and the (predicted) label data $\tilde{y}_{2m}$ (corresponding to the pairs in the data set for estimation) recorded in the recording part 190 are inputted to the learning step S130, and the learning step S130 performs learning, then the steps are the same. Thus, it is possible to execute the attack target classification predicting step S230 and the estimation learning step S240 using the learning device estimating apparatus 100.

Then, using a predetermined set of K pairs of observation data $x_{Tk}$ and label data $y_{Tk}$ for test (K is an integer equal to or larger than 2; k is an integer between 1 and K, including 1 and K), a target correct answer rate, which is a correct answer rate of the learning device 900 that has finished learning, and an estimated correct answer rate, which is a correct answer rate of the learning part 130 that has finished learning, are determined (a correct answer rate acquiring step S250). More specifically, for k=1, ..., K, the observation data $x_{Tk}$, in the pairs of the observation data $x_{Tk}$ and the label data $y_{Tk}$ for test, is inputted to the learning device 900 that has finished learning to obtain predicted label data $\tilde{y}_{TTk}$. Then, the label data $y_{Tk}$, in the pairs of the observation data $x_{Tk}$ and the label data $y_{Tk}$ for test is compared with the predicted label data $\tilde{y}_{TTk}$ to determine the target correct answer rate. Similarly, for k=1, ..., K, the observation data $x_{Tk}$, in the pairs of the observation data $x_{Tk}$ and the label data $y_{Tk}$ for test, is inputted to the learning part 130 that has finished learning to obtain predicted label data $\tilde{y}_{ETk}$. Then, the label data $y_{Tk}$, in the pairs of the observation data $x_{Tk}$ and the label data $y_{Tk}$ for test, is compared with the predicted label data $\tilde{y}_{ETk}$ to determine the estimated correct answer rate.

Then, it is judged that the risk is higher as a difference between the target correct answer rate and the estimated correct answer rate is smaller when the target correct answer rate is larger than the estimated correct answer rate, and as the estimated correct answer rate exceeds the target correct answer rate more (as the difference is larger) when the target correct answer rate is smaller than the estimated correct answer rate (a risk judging step S260). The target correct answer rate is a correct answer rate of the attack target learning device 900 that has learned using the pairs of the first data which is a large amount of data. The estimated correct answer rate is a correct answer rate of the learning part 130 that has learned using a smaller amount of data in comparison with the pairs of the first data. In other words, it can be said that an estimated attack is more successful as a difference between the target correct answer rate and the estimated correct answer rate is smaller when the target correct answer rate is larger than the estimated correct answer rate, and as the estimated correct answer rate exceeds the target correct answer rate more (as the difference is larger) when the target correct answer rate is smaller than the estimated correct answer rate.

As a specific example of the risk judgment of step S260, the following method is given. However, the method is one example, and the risk judgment is not limited to the method.

1. A user decides a threshold τ.
2. A risk value is calculated as follows:
   (1) When target correct answer rate≤estimated correct rate is satisfied, risk value=100(%) is assumed.
   (2) In other cases, risk value=((target correct answer rate-estimated correct answer rate)/target correct answer rate)×100(%) is assumed.
3. A risk judgment is made as follows:
   (1) When τ≤risk value is satisfied, a risk evaluation result is "risk is high".
   (2) In other cases, the risk evaluation result is "risk is low".

In the risk evaluation method, the first risk evaluation result or a risk value determined at the first risk judging step S260 may be outputted as it is to end the process. It is also possible to judge whether a repeat condition is satisfied (a repeat judging step S270) and, if the repeat condition is satisfied, repeat the process of steps S240 to S260 after changing parameters of the learning part 130 and the like (a parameter changing step S280). Note that, if the process is repeated, it means that a risk judgment is made a plurality of times, and a plurality of risk evaluation results exist. In this case, the worst risk evaluation result or risk value can be outputted.

As the repeat condition, "the risk evaluation result is that the risk is low", "pairs of observation data $x_{2m}$ and (predicted) label data $\tilde{y}_{2m}$ that have not been used for learning at the estimation learning step S240 remain in the data set for estimation", "there is much time allowed to determine a risk evaluation result, and it is allowed to repeat the process" or the like is conceivable. The repeat condition may be thought to be satisfied when all of these are satisfied. Other conditions may be further added, or the conditions may be changed. At the parameter changing step S280, the "parameters (for example, T) of the activation function", "weight parameter", "structure" and the like of the learning part 130 can be changed according to predetermined rules.

<Risk Evaluation Method 2>

Figure 8:
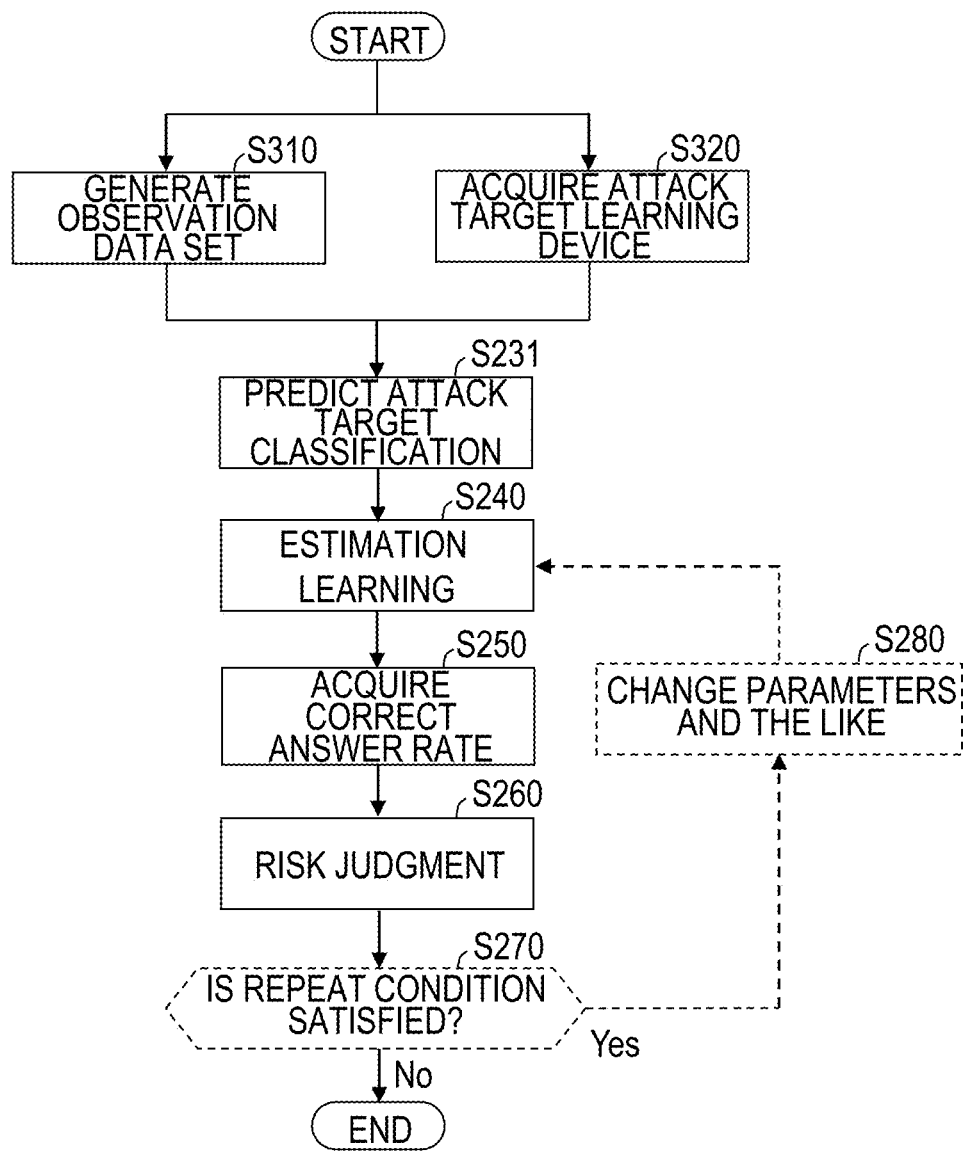
FIG. 8 is a diagram showing a process flow of a risk evaluation method 2.
Figure 9:
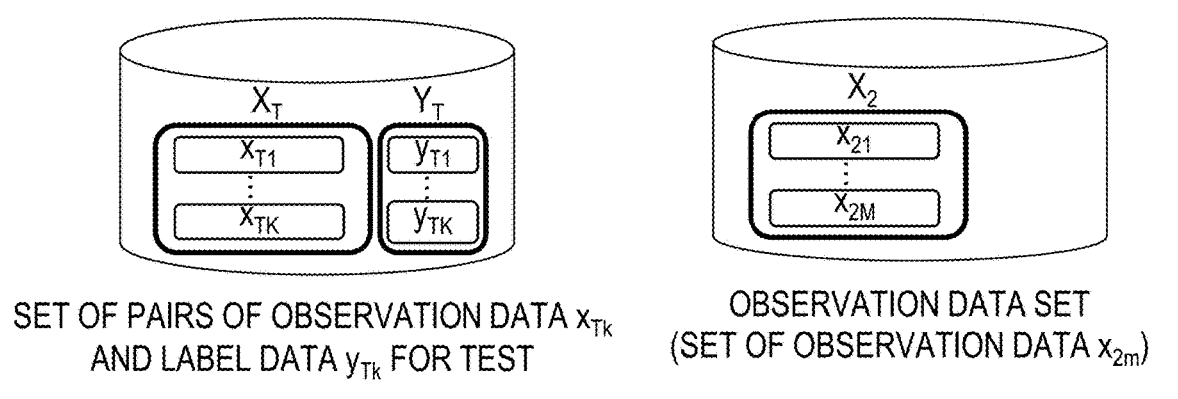
FIG. 9 is a diagram showing an image of sets of data to be prepared.
Figure 10:
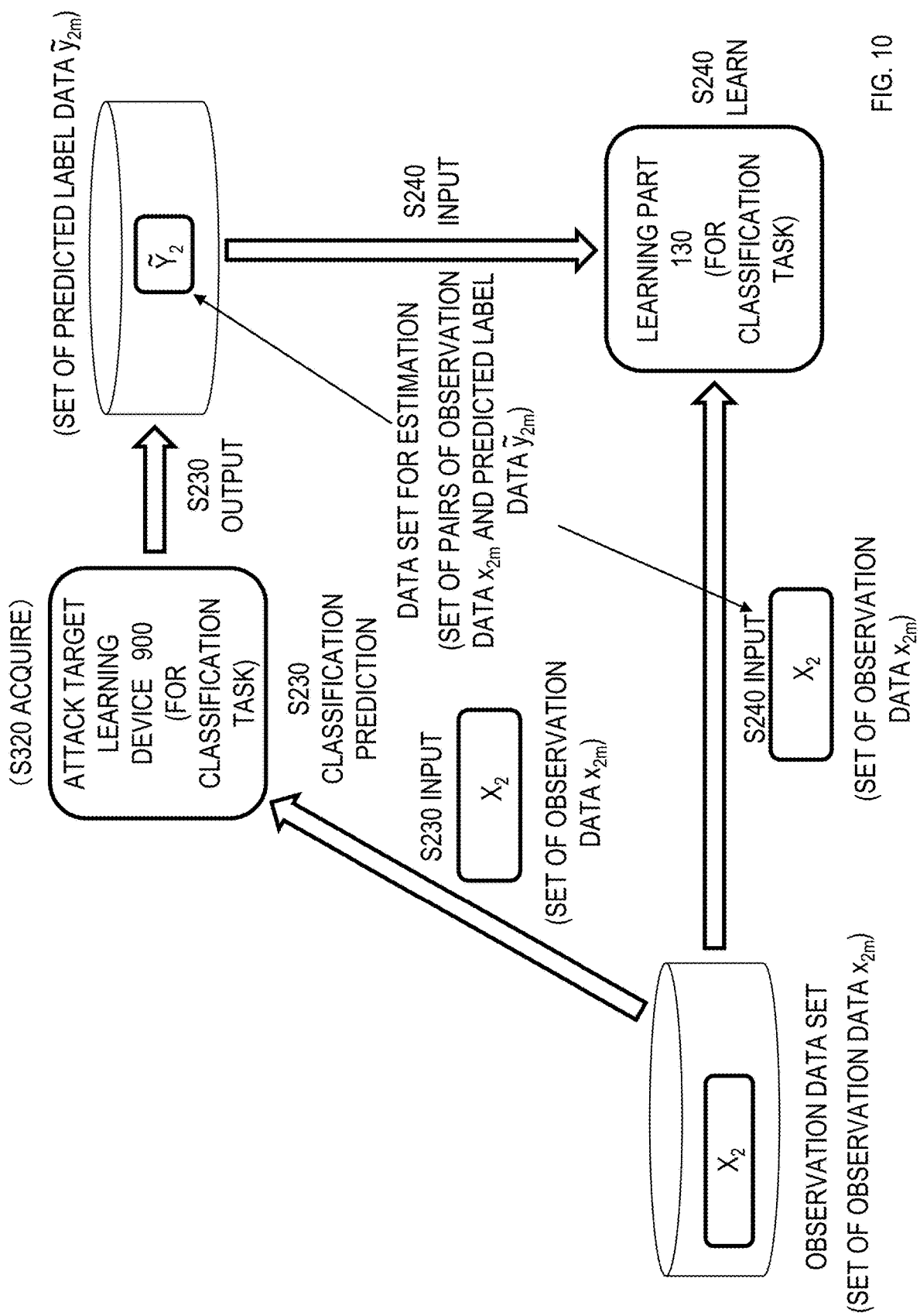
FIG. 10 is a diagram showing an image of an attack target classification predicting step and an estimation learning step of the risk evaluation method 2.

FIG. 8 shows a process flow of a risk evaluation method 2. FIG. 9 is a diagram showing an image of sets of data to be prepared, and FIG. 10 is a diagram showing an image of an attack target classification predicting step and an estimation learning step.

Though learning of the attack target learning device 900 is performed in the risk evaluation method 1, there may be a case where risk evaluation is performed for an attack target learning device 900 that has already finished learning. In the risk evaluation method 2, a learning device 900 that has finished learning is acquired (an attack target learning device acquiring step S320), and an observation data set is generated (an observation data set generating step S310). Since the learning device 900 that has finished learning may be given as a target of risk evaluation, execution is not necessarily required. The observation data set is equal to the plurality of pieces of observation data recorded in the recording part 190 in advance in the learning device estimation apparatus and the learning device estimating method. The observation data set may be prepared in advance as a plurality of pieces of observation data to be used to estimate the learning device 900. In other words, steps S310 and S320 may not be included in the process essential for the risk evaluation method.

In the risk evaluation method 2, by inputting observation data $x_{2m}$ (m=1, ..., M) in an observation data set $X_2$ to the learning device 900 and acquiring predicted label data $\tilde{y}_{2m}$ (m=1, ..., M), which is classification prediction (an output) at the time of inputting the observation data, a set of predicted label data $\tilde{Y}_2$ is acquired; and a data set for estimation, which is a pair of the set of the observation data $X^2$ and the set of predicted label data $\tilde{Y}_2$, is obtained (an attack target classification predicting step S231). The attack target classification predicting step S231 is different from the attack target classification predicting step S230 of the risk evaluation method 1 only in not using the observation data set $X_2$ of the second data set but using observation data set $X_2$ that is not paired with label data, and is substantially the same. The estimation learning step S240 is the same as the risk evaluation method 1. Images of these are shown in FIG. 10. Note that the learning part 130 uses a predetermined activation function that outputs an ambiguous value in the process for determining a classification prediction result. A specific example of the activation function that outputs an ambiguous value is the same as the description of the learning device estimating apparatus and the learning device estimating method described above.

The correct answer rate acquiring step S250 and the risk judging step S260 are the same as the risk evaluation method 1. Further, it is the same that the repeat judging step S270 and the parameter changing step S280 may be added, and content of the process in the case where steps S270 and S280 are added is the same. Since the risk evaluation methods 1 and 2 use a learning part having an activation function that outputs an ambiguous value as described above, a learning device risk evaluation method can be established.

Figure 11:
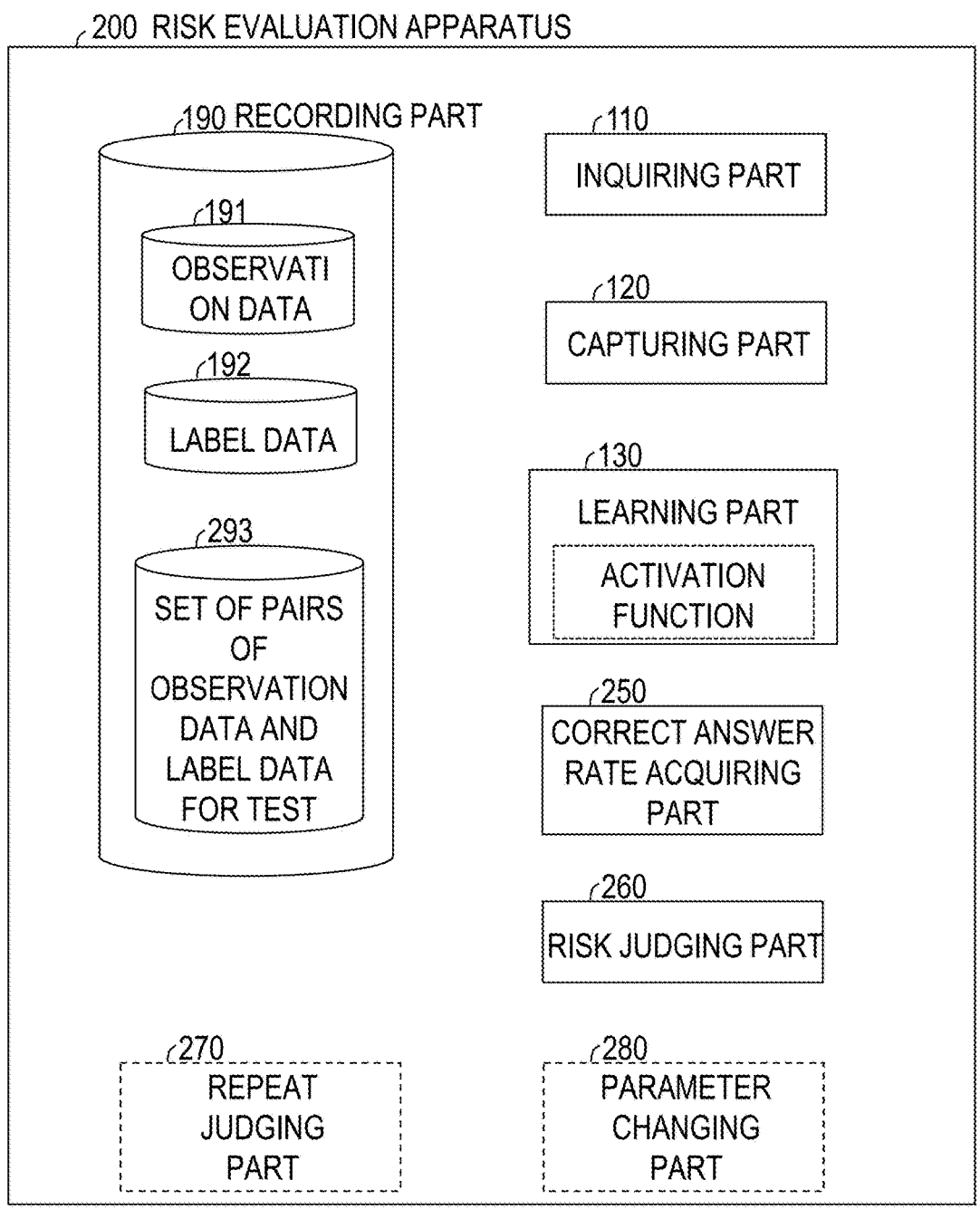
FIG. 11 is a diagram showing a functional configuration example of a risk evaluation apparatus.

As described in the risk evaluation method 1, the attack target classification predicting step S231 and the inquiring step S110 are substantially the same, and the estimation learning step S240 is substantially the same as the capturing step S120 and the learning step S130. Therefore, it is possible to execute the attack target classification predicting step S231 and the estimation learning step S240 using the learning device estimating apparatus 100. Therefore, by adding a correct answer rate acquiring part 250 to execute the correct answer rate acquiring step S250 and a risk judging part 260 to execute the risk judging step S260 and recording a set of pairs of observation data and label data for test to the recording part 190, a risk evaluation apparatus 200 can be configured (see FIG. 11). The risk evaluation apparatus 200 may be further provided with a repeat judging part 270 to execute the repeat judging step S270 and a parameter changing part 280 to execute the parameter changing step S280.

<Experiment>

Figures 12, 13:
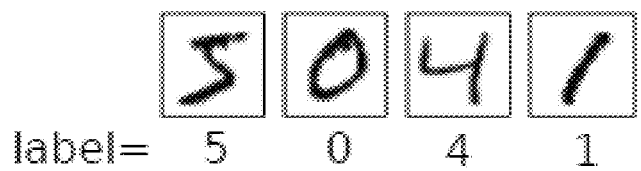
FIG. 12 is a diagram showing an example of MNIST data.
FIG. 13 is a diagram showing settings for a learning device used for an experiment.

In an experiment, the risk evaluation method 1 was executed, using MNIST data of handwritten character images of numerals from 0 to 9 (Reference document: Yann LeCun and Corinna Cortes, "MNIST handwritten digit database," 2010). FIG. 12 shows an example of the MNIST data. A MNIST data set is configured with 28×28 pixel images and types (numerals) corresponding to the images, and 55,000 pieces of training data used at the time of learning (pairs of observation data and label data for training) and 10,000 pieces of test data used to measure a classification correct answer rate (pairs of observation data and label data for test) are included. Between the training data and the test data, common data is not included. Each of the training data and the test data includes an image data set X and a type set (a set of label data) Y.

In order to create an attack target learning device 900 and a fake learning device (corresponding to the learning part 130), the MNIST data is divided as shown below and used for the experiment. First, storage order of the images in the training data is shuffled. Next, the training data is divided into five, and data $D_1$ of any four of the five (data of 44,000 pairs corresponding to the first data set) is used to cause the attack target learning device 900 to learn (corresponding to S210 and S220). Observation data of data $D_2$ of the remaining one (data of 11,000 pairs corresponding to the second data set) is inputted to the attack target learning device 900, and predicted label data, which is a classification prediction result, is acquired (corresponding to S230). Then, the fake learning device (corresponding to the learning part 130) learns with the observation data of the data $D_2$ and the predicted label data (corresponding to S240). In the experiment, a learning device that has learned using the data $D_1$ among learning devices on a cloud is considered as the attack target learning device 900, and the learning device that has learned by the process of steps S230 and S240 using the data $D_2$ is considered as the fake learning device created by an attacker. Here, a classification result $\tilde{Y}_j$ obtained from the attack target learning device is assumed to be a vector obtained from the softmax function with temperature of Formula (2) when the temperature T is 1. Each of all results shown below indicates an average among five patterns of dividing the MNIST data set into the data $D_1$ and the data $D_2$.

FIG. 13 shows settings for a learning device used for this experiment; FIG. 14 shows specifications of the learning device; and FIG. 15 shows a relationship between the number of pieces of data used for learning and a correct answer rate. In this experiment, a plurality of structures are used; and, for all the structures, parameters and methods used for learning are set as shown in FIG. 13. Learning devices shown in this experiment are as shown in FIG. 14. Note that fc, cony and pool indicate a fully connected layer, a convolutional layer, a pooling layer of a neural net, respectively. As for lines of FIG. 14, a direction from an upper line toward a lower line indicates a direction from an input layer toward an output layer. A learning device A is set as the attack target learning device. As the fake learning device (corresponding to the learning part 130), both of the learning device A and a learning device B are used.

A correct answer rate of the attack target learning device 900 (corresponding to a target correct answer rate) was 97.439%. For this attack target learning device, correct answer rates at the learning device A and the learning device B (corresponding to estimated correct answer rates) were measured while the number of pieces of data used for learning of an estimated learning device being changed. FIG. 15 shows a result of the measurement. Here, the temperature T of the softmax function with temperature was set to 32.0.

In general, a correct answer rate of a learning device is improved as the number of pieces of data used for learning increases. In the present result, even when the number of pieces of data used by an attacker is 687, a difference between correct answer rates of the attack target learning device 900 and the fake learning device (corresponding to the learning part 130) is 97.439−90.817=6.622(%) when the fake learning device is the learning device A, and 97.439−93.391=4.048(%) when the fake learning device is the learning device B, the difference being below 10%. Further, when the fake learning device is the learning device B, the correct answer rate is higher by 98.311−97.439=0.872(%) when the number of pieces of data is 11,000. From this, it is seen that, by using the learning part 130 using the softmax function with temperature, a learning device for classification can be effectively estimated. Further, it is seen that, by the risk evaluation method of the present invention, a risk evaluation method for the learning device can be established.

[Program and Recording Medium]

The various kinds of processes described above not only are executed in time series in order of the description but also may be executed in parallel or individually according to processing capabilities of apparatuses that execute the processes or as necessary. In addition, it goes without saying that it is possible to appropriately make a change within a range not departing from the spirit of the present invention.

In the case of realizing the above configuration with a computer (a processing circuit), processing content of functions that each apparatus should have is written by a program. By executing this program on the computer, the processing functions described above are realized on the computer.

The program in which the processing content is written can be recorded in a computer-readable recording medium. As the computer-readable recording medium, anything is possible, for example, a magnetic recording device, an optical disk, a magneto-optical recording medium or a semiconductor memory.

Distribution of this program is performed, for example, by performing sales, transfer, rent or the like of a portable recording medium, such as a DVD or a CD-ROM, in which the program is recorded.

Furthermore, a configuration is also possible in which this program is stored in a storage device of a server computer and is distributed by being transferred from the server computer to other computers via a network.

For example, first, a computer that executes such a program stores the program recorded in a portable recording medium or transferred from a server computer into its own storage device once. Then, at the time of executing a process, the computer reads the program stored in its own recording medium and executes the process according to the read program. Further, as another execution form of this program, a computer may directly read the program from a portable recording medium and execute a process according to the program. Furthermore, each time a program is transferred to the computer from the sever computer, the computer may sequentially execute a process according to the received program. Further, a configuration is also possible in which the above process is executed by a so-called ASP (Application Service Provider) type service in which, without transferring the program from the server computer to the computer or the built-in apparatus, the processing functions are realized only by an instruction to execute the program and acquisition of a result. Note that it is assumed that, as the program in this form, information which is provided for processing by an electronic calculator and is equivalent to a program (data or the like which is not a direct command to the computer but has a nature of specifying processing of the computer) is included.

Further, though it is assumed in this form that the apparatus is configured by causing a predetermined program to be executed on a computer, at least a part of these processing contents may be realized as hardware.

DESCRIPTION OF REFERENCE NUMERALS 100 learning device estimating apparatus
110 inquiring part
120 capturing part
130 learning part
190 recording part
900 learning device

What is claimed is:

1. A learning device estimating apparatus for use with a learning device, for classification task that outputs a type of inputted observation data as label data, as an attack target, the learning device estimating apparatus comprising:
- a memory;
- inquiring circuitry;
- capturing circuitry; and
- learning circuitry, wherein:
- the memory stores a predetermined plurality of pieces of observation data,
- the inquiring circuitry inquires of the attack target learning device for each of the pieces of observation data recorded in the memory to acquire label data and records the acquired label data to the memory in association with observation data;
- the capturing circuitry inputs the observation data and the label data associated with the observation data that have been recorded to the memory, to the learning circuitry; and
- the learning circuitry is characterized by using an activation function that outputs a predetermined ambiguous value in a process for determining a classification prediction result, and the learning circuitry performs learning using the inputted observation data and label data.

2. A learning device estimating method for use with a learning device, for classification task that outputs a type of inputted observation data as label data, as an attack target, the learning device estimating method using a learning device estimating apparatus comprising a memory, inquiring circuitry, capturing circuitry, and learning circuitry, the learning device estimating method comprising:
- an inquiring step;
- a capturing step; and
- a learning step, wherein:
- the memory stores a predetermined plurality of pieces of observation data,
- at the inquiring step, the inquiring circuitry inquires of the attack target learning device for each of the pieces of observation data recorded in the memory to acquire label data and records the acquired label data to the memory in association with observation data,
- at the capturing step, the capturing circuitry inputs the observation data and the label data associated with the observation data that have been recorded to the memory, to the learning circuitry, and
- at the learning step, the learning circuitry uses an activation function that outputs a predetermined ambiguous value in a process for determining a classification prediction result, and the learning circuitry performs learning using the inputted observation data and label data.

3. The learning device estimating method according to claim 2, wherein:
the activation function that outputs the ambiguous value reduces a generalization error.

4. The learning device estimating method according to claim 2, wherein:
a number of classified types is indicated by D (here, D is an integer equal to or larger than 2), T indicates a predetermined value equal to or larger than 1, c indicates an integer between 1 and D, including 1 and D, $u_c$ indicates the c-th element of a vector inputted to the activation function, and $\tilde{y}_c$ indicates the c-th element of a vector outputted as a classification result; and
the activation function is:

$$\tilde{y}_c = \frac{\exp(u_c/T)}{\sum_{d=1}^{D}\exp(u_c/T)}.$$

5. A non-transitory computer readable medium storing a program for causing a computer to execute the learning device estimating method according to claim 2.

6. A non-transitory computer readable medium storing a program for causing a computer to execute the learning device estimating method according to claim 3.

7. A non-transitory computer readable medium storing a program for causing a computer to execute the learning device estimating method according to claim 4.

8. A risk evaluation apparatus for evaluating a risk of an attack to a learning device for classification task that outputs a type of inputted observation data as label data, the risk evaluation apparatus comprising:
- the learning device estimating apparatus according to claim 1;
- correct answer rate acquiring circuitry determining a target correct answer rate, which is a correct answer rate of the learning device that has finished learning, and an estimated correct answer rate, which is a correct answer rate of the learning circuitry that has finished learning, using a predetermined plurality of pairs of observation data and label data for test; and
- risk judging circuitry judging that a risk is higher as a difference between the target correct answer rate and the estimated correct answer rate is smaller when the target correct answer rate is larger than the estimated correct answer rate, and as the estimated correct answer rate exceeds the target correct answer rate more when the target correct answer rate is smaller than the estimated correct answer rate.

9. A risk evaluation method for evaluating a risk of an attack to a learning device for classification task that outputs a type of inputted observation data as label data, using a learning device estimating apparatus comprising a learning circuitry, the risk evaluation method comprising:
- an attack target classification predicting step of inputting a plurality of pieces of observation data to the learning device that has finished learning, acquiring pieces of predicted label data that are classification predictions at the time of inputting the plurality of observation data, and obtaining a data set for estimation that is a set of pairs of observation data and predicted label data;
- an estimation learning step of learning the learning circuitry using the data set for estimation to obtain the learning circuitry that has finished learning;
- a correct answer rate acquiring step of determining a target correct answer rate, which is a correct answer rate of the learning device that has finished learning, and an estimated correct answer rate, which is a correct answer rate of the learning circuitry that has finished learning, using a predetermined plurality of pairs of observation data and label data for test; and
- a risk judging step of judging that a risk is higher as a difference between the target correct answer rate and the estimated correct answer rate is smaller when the target correct answer rate is larger than the estimated correct answer rate, and as the estimated correct answer rate exceeds the target correct answer rate more when the target correct answer rate is smaller than the estimated correct answer rate, wherein the learning circuitry uses an activation function that outputs a predetermined ambiguous value in a process for determining a classification prediction result.

10. The risk evaluation method according to claim 9, further comprising:

a dividing step of dividing a predetermined set of a plurality of pairs of observation data and label data for training into a first data set and a second data set; and an attack target learning device learning step of causing the attack target learning device to learn using the first data set to obtain the learning device that has finished learning, wherein:

the number of pairs of the first data set is larger than the number of pairs of the second data set; and the plurality of pieces of observation data inputted to the learning device at the attack target classification predicting step are pieces of observation data in the second data set.

11. A non-transitory computer readable medium storing a program for causing a computer to execute the risk evaluation method according to claim 9.

12. A non-transitory computer readable medium storing a program for causing a computer to execute the risk evaluation method according to claim 10.

* * * * *